United States Patent
Kim

(10) Patent No.: US 11,544,980 B2
(45) Date of Patent: Jan. 3, 2023

(54) ELECTRONIC KEY STORAGE DEVICE

(71) Applicant: PLATFORMBASE CO., LTD, Suwon-si (KR)

(72) Inventor: Bum Soo Kim, Namyangju-si (KR)

(73) Assignee: PLATFORMBASE CO., LTD, Suwon-si (KR)

( * ) Notice: Subject to any disclaimer, the term of this patent is extended or adjusted under 35 U.S.C. 154(b) by 0 days.

(21) Appl. No.: 17/281,569

(22) PCT Filed: Nov. 2, 2020

(86) PCT No.: PCT/KR2020/015173
§ 371 (c)(1),
(2) Date: Mar. 30, 2021

(87) PCT Pub. No.: WO2021/086160
PCT Pub. Date: May 6, 2021

(65) Prior Publication Data
US 2022/0005300 A1  Jan. 6, 2022

(30) Foreign Application Priority Data

Nov. 1, 2019 (KR) .................. 10-2019-0138470
Nov. 1, 2019 (KR) .................. 10-2019-0138471
Nov. 2, 2020 (KR) .................. 10-2020-0144719

(51) Int. Cl.
*G07C 9/00* (2020.01)

(52) U.S. Cl.
CPC ..... *G07C 9/00896* (2013.01); *G07C 9/00174* (2013.01); *G07C 2009/00579* (2013.01); *G07C 2009/00936* (2013.01); *G07C 2209/62* (2013.01)

(58) Field of Classification Search
CPC .................. G07C 2009/00936; G07C 9/00174
See application file for complete search history.

(56) References Cited

U.S. PATENT DOCUMENTS

| | | | | |
|---|---|---|---|---|
| 6,943,666 B2* | 9/2005 | Mooney | .............. | H02J 7/0045 307/10.3 |
| 9,053,592 B2* | 6/2015 | Sato | .............. | E05B 47/00 |
| 2005/0159856 A1* | 7/2005 | Daghan | .............. | G07C 5/008 701/1 |

(Continued)

FOREIGN PATENT DOCUMENTS

| | | |
|---|---|---|
| JP | 2017-218739 A | 12/2017 |
| JP | 2019-094642 A | 6/2019 |

(Continued)

*Primary Examiner* — Daniell L Negron
(74) *Attorney, Agent, or Firm* — Novick, Kim & Lee PLLC; Jae Youn Kim

(57) ABSTRACT

An electronic key storage device including an openable and closable door and a plurality of key holders includes a storage unit configured to store key information of an electronic key usable for each registered user and location information of the key holder matching the electronic key, a user authentication unit configured to perform user authentication by receiving user authentication information so that the door is openable or closable, and a control unit configured to control a fastening operation of the key holder to put the electronic key in the key holder and take the electronic key out of the key holder.

14 Claims, 5 Drawing Sheets

(56) References Cited

U.S. PATENT DOCUMENTS

2008/0258869 A1* 10/2008 Ognjenovic ....... G07C 9/00896
340/5.73
2019/0251775 A1   8/2019 Denison

FOREIGN PATENT DOCUMENTS

KR   10-2019-0105776 A   9/2019
KR   10-2019-0114593 A   10/2019

* cited by examiner

ELECTRONIC KEY STORAGE DEVICE

TECHNICAL FIELD

The present invention relates to an electronic key storage device, and more particularly, to an electronic key storage device for efficiently managing a plurality of electronic keys.

BACKGROUND ART

In general, a plurality of keys used in parking management facilities, hotels, collective buildings, banks and offices are stored in a key storage box for storage and management. The key storage box is provided with a key holder including a plurality of hanger members capable of hanging keys inside a housing, and as a result, a plurality of keys may be stored.

However, since these key storage boxes simply provide only a function of storing keys, it is difficult to store and efficiently manage keys.

Meanwhile, locking devices installed for security on entrance doors, lockers, facilities, etc., may be largely classified into mechanical locking devices and electronic locking devices. In the case of a mechanical locking device that opens and closes an entrance door, a locker, etc., using a key, there is a problem of having to replace the locking device when the key is lost, along with security problems due to manipulation or storage of the key.

In view of this, the electronic locking device that opens and closes a door using a password, a user's fingerprint and voice or an electronic key has been frequently used. Since there is no fear of losing keys, general users may easily open and close doors and lockers through simple authentication, and security is excellent, the market of the electronic locking devices is rapidly growing in recent years.

Therefore, when the plurality of electronic locking devices are installed in a plurality of locations, an electronic key storage box is required to prevent loss by storing a plurality of electronic keys and to efficiently manage the electronic keys.

DISCLOSURE

Technical Problem

The technical problem to be solved by the present invention is to provide an electronic key storage device capable of improving user convenience while stably managing a plurality of electronic keys by converting usage status and records into data.

Objects of the present invention are not limited to the object(s) mentioned above, and other object(s) that are not mentioned may be obviously understood by those skilled in the art from the following description.

Technical Solution

According to an aspect, an electronic key storage device including an openable and closable door and a plurality of key holders may include: a storage unit configured to store key information of an electronic key usable for each registered user and location information of the key holder matching the electronic key; a user authentication unit configured to perform user authentication by receiving user authentication information so that the door is openable or closable; and a control unit configured to control a fastening operation of the key holder to put the electronic key in the key holder and take the electronic key out of the key holder.

Further, according to an embodiment of the present invention, the user authentication unit may perform user authentication by acquiring authentication information of any one of a password, biometric information, an NFC tag, and an RFID tag.

Further, according to an embodiment of the present invention, the electronic key storage device may further include: a sensor, an LCD panel, a keypad, and a speaker configured to detect whether the door is opened or closed and whether the electronic key is stored, in which when the sensor detects that the door is opened for a certain period of time while the electronic key is taken out of the key holder, the control unit may transmit a warning message to a user's terminal of the taken out electronic key.

Further, according to an embodiment of the present invention, when the sensor detects that the door is opened for a certain period of time while the electronic key is put in the key holder, a warning notification may be output through at least one of the LCD panel and the speaker.

Further, according to an embodiment of the present invention, the electronic key storage device may further include: a light emitting unit that is provided around the key holder and emitting light in different colors according to the key holder matching the electronic key usable for each registered user.

Further, according to an embodiment of the present invention, when the electronic key is put in the key holder, the electronic key may be charged, and the light emitting unit may emit light in different colors according to the state of charge of the electronic key.

Further, according to an embodiment of the present invention, the electronic key storage device may further include: a camera configured to photograph an object accessing the electronic key storage device.

Further, according to an embodiment of the present invention, the control unit may update firmware information of the electronic key put in the key holder.

Further, according to an embodiment of the present invention, the electronic key storage device may further include: an information acquisition unit configured to acquire access right information for each electronic key on an electronic locking device.

Further, according to an embodiment of the present invention, the access right information may include at least one of a date, a day of the week, and a time when the access to the electronic locking device is possible.

Advantageous Effects

The effects according to the present invention are as follows.

It is possible to improve the security and user convenience by using the electronic key storage device proposed in the present invention, and it is also possible to easily collect the use history of the electronic key in this process.

The effects of the present disclosure are not limited to the above-mentioned effects, and other effects that are not mentioned may be obviously understood by those skilled in the art from the following description.

DESCRIPTION OF MAIN REFERENCE NUMERALS OF DRAWINGS

Figure 1:
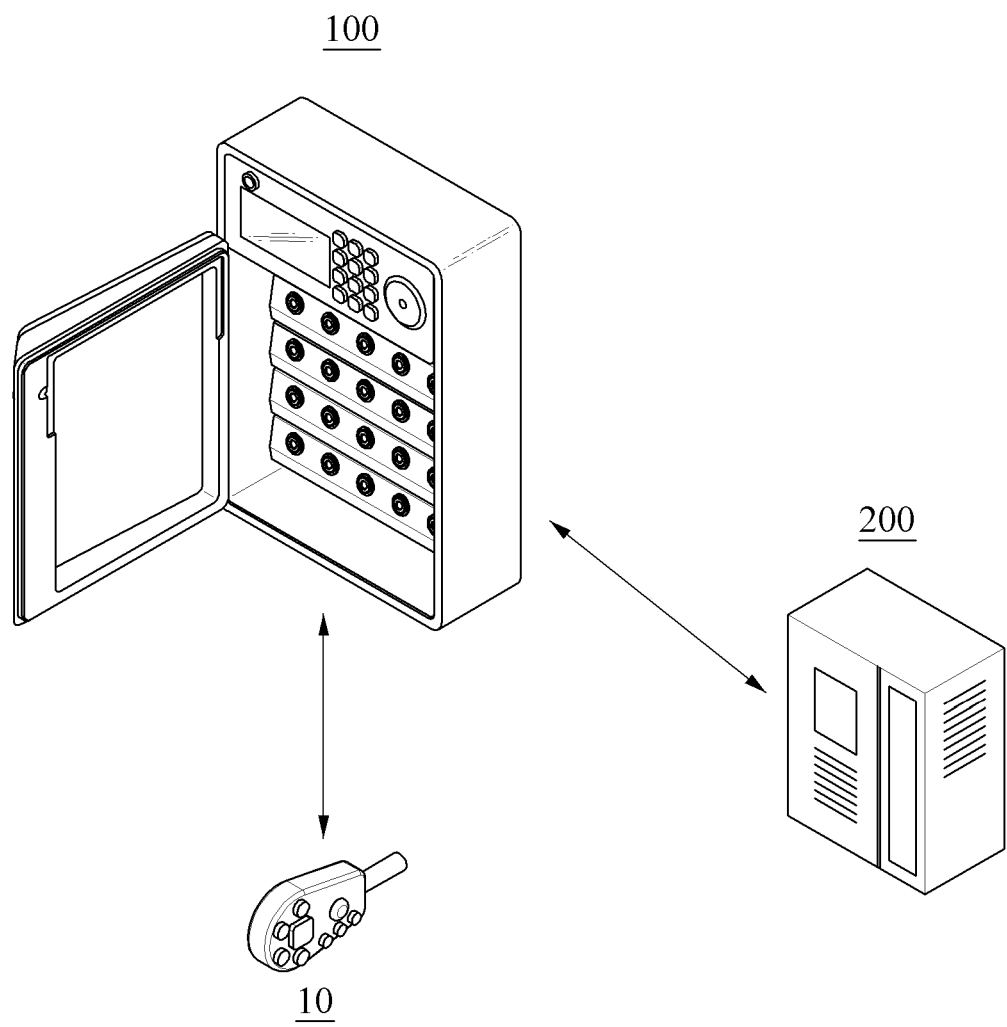
FIG. 1 is a diagram for describing a system in which an electronic key storage device according to an embodiment of the present invention is used.

10: Electronic key
20: Emergency key hole
100: Electronic key storage device
110: Door
120: Key holder
130: Input unit
140: Output unit
150: Data transmission/reception unit
160: Storage unit
170: User authentication unit
180: Control unit
190: Light emitting unit
200: External server
300: Electronic locking device
L: LCD panel
P: Keypad
S: Speaker
C: Camera

BEST MODE

Since the present invention may be variously modified and have several exemplary embodiments, specific exemplary embodiments will be illustrated in the accompanying drawings and be described in detail in a detailed description. However, it is to be understood that the present invention is not limited to a specific exemplary embodiment, but includes all modifications, equivalents, and substitutions without departing from the scope and spirit of the present invention. In describing each drawing, similar reference numerals are used for similar components.

Terms such as 'first', 'second', 'A', 'B', and the like, may be used to describe various components, but the components are not to be interpreted to be limited to the terms. The terms are used only to distinguish one component from another component. For example, a 'first' component may be named a 'second' component and the 'second' component may also be similarly named the 'first' component, without departing from the scope of the present disclosure. A term 'and/or' includes a combination of a plurality of related described items or any one of the plurality of related described items.

It is to be understood that when one component is referred to as being "connected to" or "coupled to" another component, one component may be connected directly to or coupled directly to another component or be connected to or coupled to another component with the other component interposed therebetween. On the other hand, it should be understood that when one element is referred to as being "connected directly to" or "coupled directly to" another element, it may be connected to or coupled to another element without the other element interposed therebetween.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, numerals, steps, operations, components, parts mentioned in this specification, or a combination thereof, but do not preclude the presence or addition of one or more other features, numerals, steps, operations, components, parts, or a combination thereof.

Unless indicated otherwise, it is to be understood that all the terms used in the specification including technical and scientific terms have the same meaning as those that are generally understood by those who skilled in the art. Terms generally used and defined by a dictionary should be interpreted as having the same meanings as meanings within a context of the related art and should not be interpreted as having ideal or excessively formal meanings unless being clearly defined otherwise in the present invention.

Hereinafter, preferred embodiments of the present disclosure will be described in detail with reference to the accompanying drawings.

Figure 2:
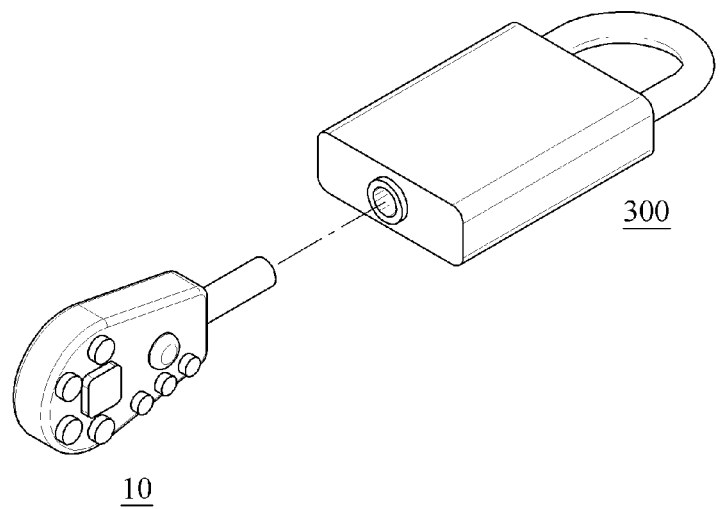
FIG. 2 is a view for describing an electronic key and an electronic locking device according to an embodiment of the present invention.

FIG. 1 is a diagram for explaining a system in which an electronic key storage device is used according to an embodiment of the present invention, and FIG. 2 is a diagram for describing an electronic key and an electronic locking device according to an embodiment of the present invention.

Referring to FIG. 1, a system in which an electronic key storage device 100 of the present invention is used may be configured to include an electronic key storage device 100, an electronic key 10, and an external server 200.

The electronic key storage device 100 may interlock with the external server 200 to store registration information of a user, access right information of the electronic key 10, firmware information of the electronic key 10, and the like that are previously stored in the external server 200, transmit a use history of the electronic key 10 to the external server 200, or transmit and receive a variety of other data.

The electronic key storage device 100 is a device that stores the electronic key 10 for locking and unlocking an electronic locking device 300, and may store a plurality of electronic keys 10 in one storage device 100.

As illustrated in FIG. 2, the electronic locking device 300 may be implemented in the form of a pad lock, but is not limited thereto. Accordingly, all locking devices used for drawers, cabinets, storage boxes, or the like such as Europrofile double, rim lock, drawer lock, and cam lock may be the electronic locking device 300.

The electronic key 10 may be implemented in a form including a plurality of buttons and a keypad P, but may include various sensors capable of utilizing biometric information such as a fingerprint sensor.

The electronic locking device 300 does not have a separate power source and is temporarily supplied with power from a connection terminal of the electronic key 10 through the connection terminal, thereby unlocking the electronic locking device 300. In this case, the connection terminal of the electronic locking device 300 and the connection terminal of the electronic key 10 may physically contact to supply power as well as exchange identifiers (UIDs) of each other, thereby performing authentication.

Figure 3:
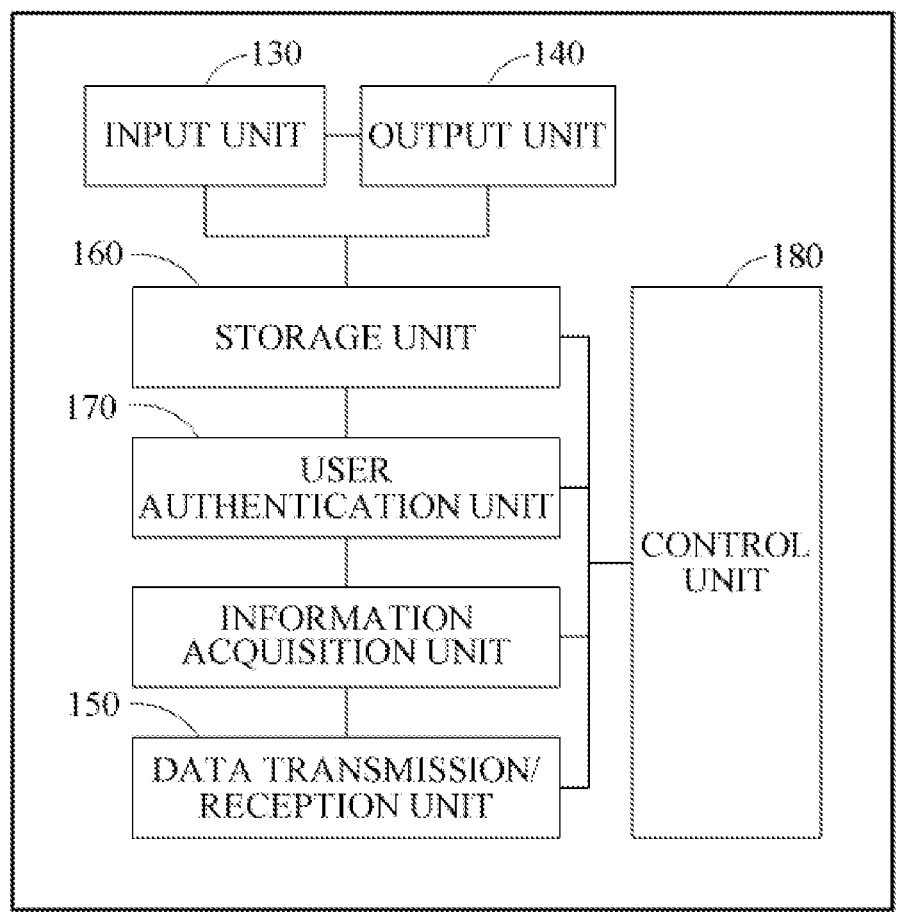
FIG. 3 is a block diagram illustrating an electronic key storage device according to an embodiment of the present invention.
Figure 4:
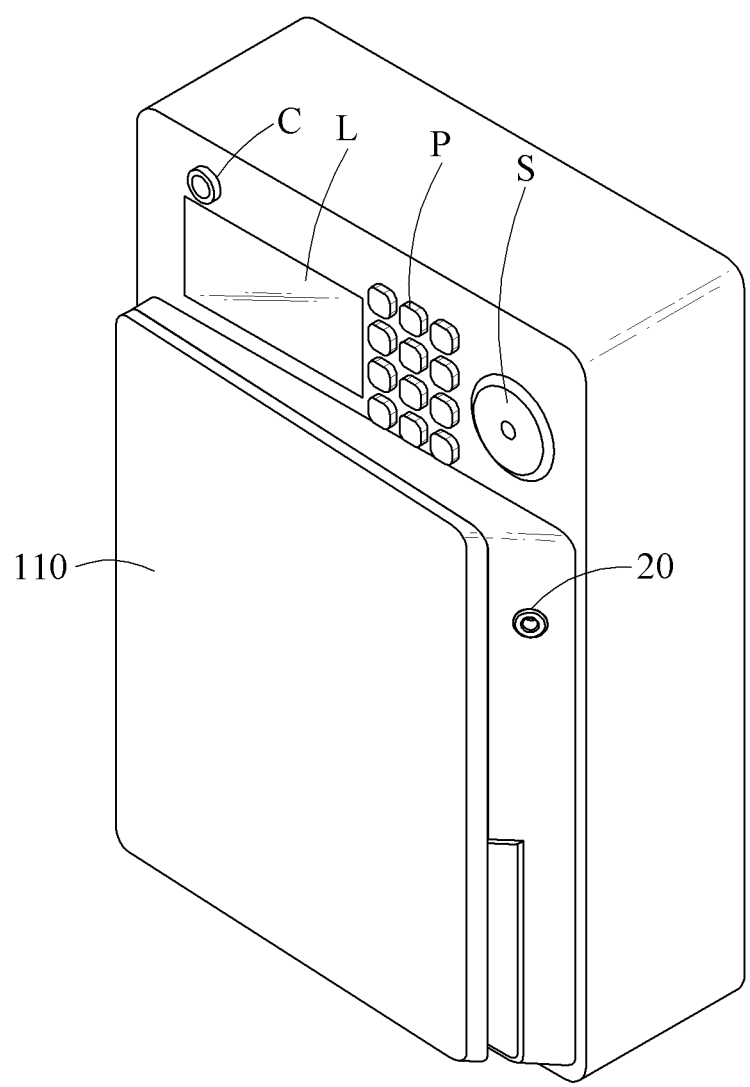
FIGS. 4 and 5 are diagrams illustrating in detail the electronic key storage device of FIG. 3.
Figure 5:
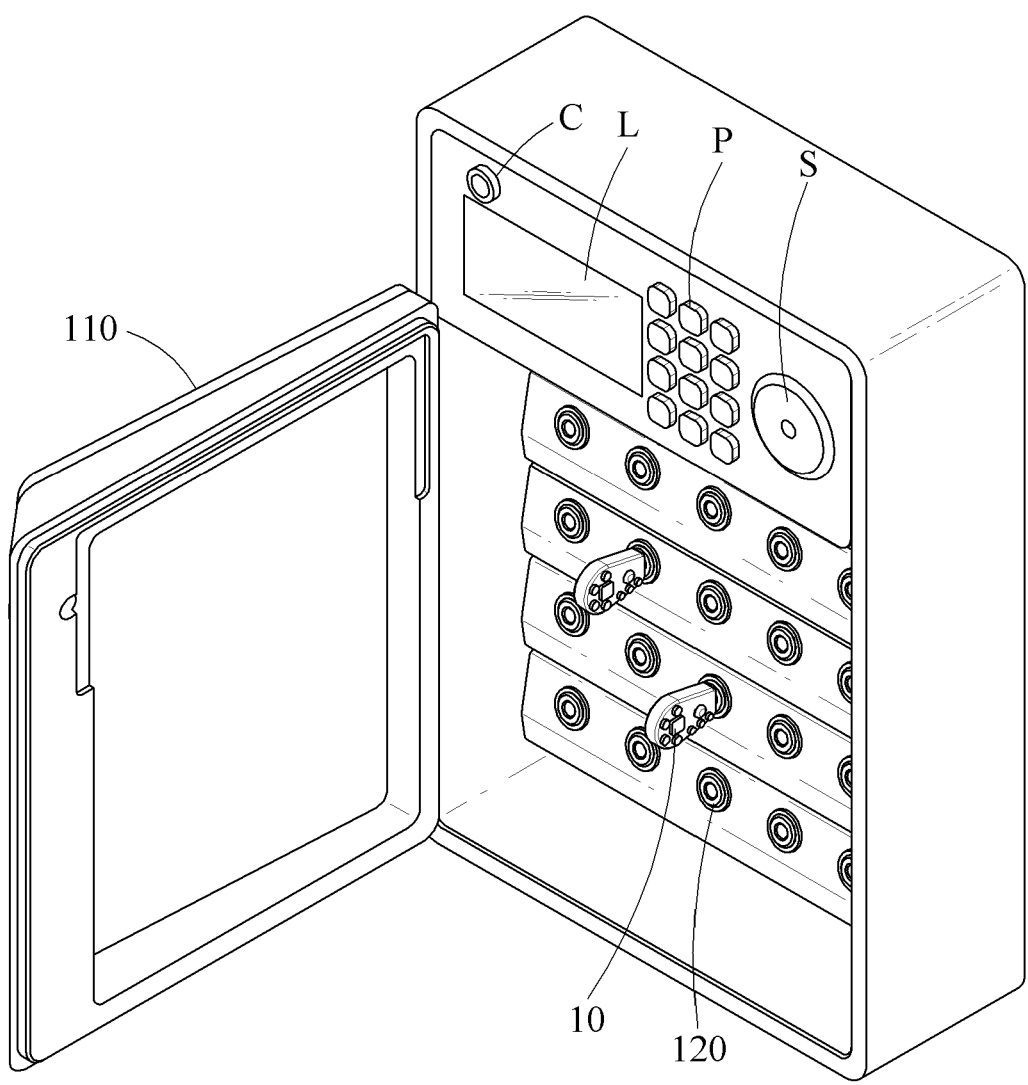
Figure 6:
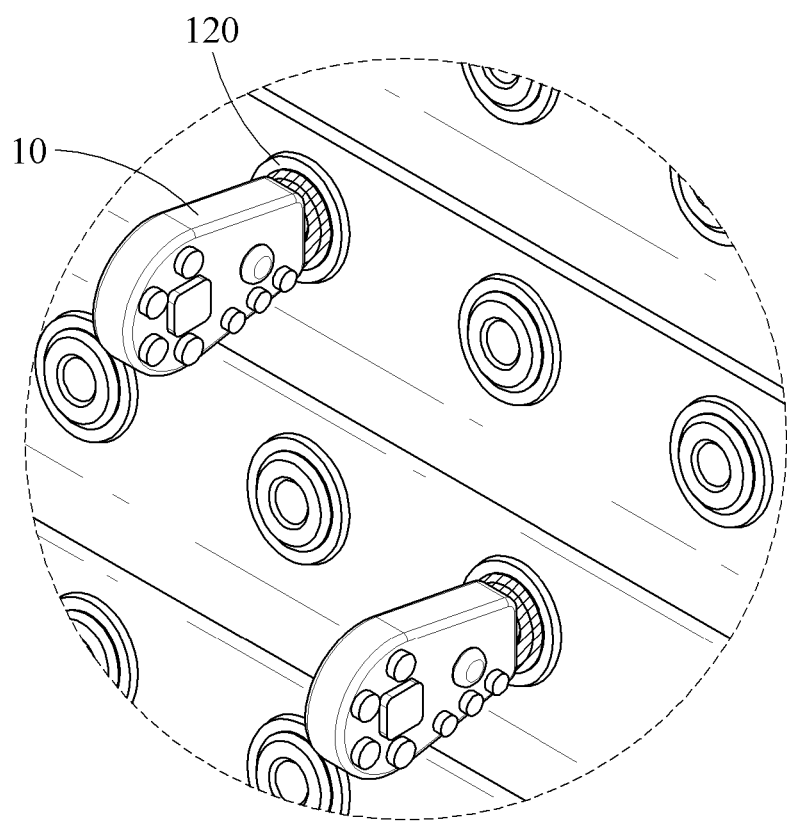
FIG. 6 is a diagram illustrating a state in which an electronic key is inserted into a key holder according to an embodiment of the present invention.
Figure 7:
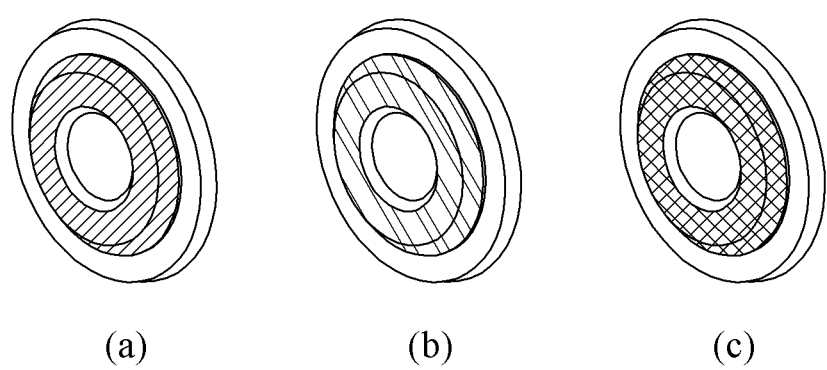
FIG. 7 is a diagram illustrating a light emitting unit according to an exemplary embodiment of the present invention.

FIG. 3 is a block diagram illustrating the electronic key storage device 100 according to the embodiment of the present invention, FIGS. 4 and 5 are diagrams illustrating in detail the electronic key storage device 100 of FIG. 3, FIG. 6 is a diagram illustrating a state in which the electronic key 10 is inserted into a key holder 120 according to an embodiment of the present invention, and FIG. 7 is a diagram illustrating a light emitting unit 190 according to an exemplary embodiment of the present invention.

The electronic key storage device 100 according to the embodiment of the present invention may include a main body of the device and an openable door 110 coupled to the main body.

The main body may include a plurality of key holders 120, an input unit 130, an output unit 140, a data transmission/reception unit 150, a storage unit 160, a user authentication unit 170, and a control unit 180.

The plurality of key holders 120 are holders for accommodating the plurality of electronic keys 10, and may be accommodated by matching one electronic key 10 to one key holder 120 one-to-one. In this case, it is possible to store the plurality of electronic keys 10 by inserting the electronic keys 10 into each of the key holders 120. In one embodiment, 25 key holders 120 may be provided in the main body, but the number of key holders 120 is not limited thereto.

The input unit 130 may receive information for use of the electronic key storage device 100 from a user through an input interface and transmit the received information to the control unit 180, and the output unit 140 may output the input command or information through an output interface under the control of the control unit 180.

In this case, the electronic key storage device 100 may further include an LCD panel L, a keypad P, a speaker S, and a camera C, and the above-described components may be used as the input unit 130 or the output unit 140.

In one embodiment, the LCD panel L may be used as the input unit 130 when a user inputs information through a touch operation, and may be used as the output unit 140 when the input information is displayed on the LCD panel L. In another embodiment, the speaker S may be used as the input unit 130 when the user inputs information through voice, and may be used as the output unit 140 when the input information is output as voice.

The data transmission/reception unit 150 may transmit and receive information by communicating with the external server 200 or various terminals.

When communicating with the external server 200, the data transmission/reception unit 150 may receive the registration information of the user, the access right information of the electronic key 10, the firmware information of the electronic key 10, and the like that are previously stored in the external server 200, transmit the use history of the electronic key 10 to the external server 200, or transmit and receive a variety of other data.

In this case, when communicating between the external server 200 and the electronic key storage device 100 through the data transmission/reception unit 150, a separate encryption module, an encryption authentication system, an encryption algorithm, and the like may be applied to protect data.

For example, an algorithm according to the encryption certification system (Korea Cryptographic Module Validation Program (KCMVP)) may be applied, or an encryption standard algorithm (Advanced Encryption Standard (AES)-256) may be applied.

The storage unit 160 may store the key information of the electronic key 10 usable for each registered user and the location information of the key holder 120 matching the electronic key 10.

Specifically, the storage unit 160 may store registration information of a user who has been given an authority to be able to use the electronic keys 10, information of the electronic key 10 that may be used by a registered user among the plurality of electronic keys 10, and location information of the key holder 120 that may be stored for each electronic key 10. Here, various types of information stored in the storage unit 160 may be received from the external server 200 through the transmission/reception unit or may be self-stored when the storage device 100 is set.

The user authentication unit 170 may perform the user authentication by receiving the user authentication information so that the door 110 may be opened or closed.

Specifically, the user authentication unit 170 may perform the user authentication by acquiring authentication information of any one of biometric information, an NFC tag, and an RFID tag.

In one embodiment, when the NFC tagging technology is adopted, the user authentication unit 170 may be implemented as an NFC reader, and the NFC tag may be provided to the user who has the authority to use the electronic key 10. In this case, the user authentication information stored in the provided NFC tag is preferably stored in the storage unit 160.

In another embodiment, when the biometric information recognition technology is adopted, the user authentication unit 170 may be implemented as a fingerprint recognition sensor, an iris recognition sensor, a face recognition sensor, or the like. In this case, it is preferable that the user's biometric information for the user authentication is stored in the storage unit 160.

The user authentication using the authentication information such as the biometric information, the NFC tag, and the RFID tag has been described, but the present invention is not limited thereto, and other known user authentication technologies such as password input may be applied. In addition, the user authentication may be performed by another external authentication server, and only the authentication results may be provided.

The control unit 180 may control a fastening operation of the key holder 120 to put the electronic key 10 in the key holder 120 and take the electronic key 10 out of the key holder 120.

In one embodiment, when the electronic key 10 is take out of the key holder 120, the fastening operation of the key holder 120 may be controlled based on the registration information of the user so that the electronic key 10 may be taken out of the key holder 120 in which the electronic key 10 that may be used by the user is accommodated or the electronic key 10 may not be taken out of the key holder 120 in which the electronic key 10 that may not be used by the user is accommodated.

In another embodiment, when the electronic key 10 is again put in the key holder 120, the fastening operation of the key holder 120 may be controlled based on the registration information of the user so that the electronic key 10 may be inserted into the key holder 120 matching the electronic key 10 that may be used by the user or the electronic key 10 may not be inserted into the key holder 120 matching the electronic key 10 that may not be used by the user.

For example, the operation may be an act of releasing the fastening such as tightening, between the key holder 120 and the electronic key 10 or locking again.

Meanwhile, the control unit 180 may update the firmware information of the electronic key 10 received through the data transmission/reception unit 150 in addition to the above-described control operation, or may update the use history of the electronic key 10 received from the electronic key 10.

The electronic key storage device 100 of the present invention may further include a sensor for detecting whether the door 110 is opened or closed and whether the electronic key 10 is stored.

In this case, the sensor may include a first sensor provided in the door to detect whether the door 110 is opened or closed, and a second sensor provided in the main body to detect whether the electronic key 10 is accommodated.

In various cases, the sensor may detect whether the door 110 is opened or closed and whether the electronic key 10 is stored. In particular, the sensor may detect the case where the door 110 is opened to maintain the stability of the storage device 100.

In an embodiment, the sensor may detect that the door 110 is opened for a certain period of time while the electronic key 10 is taken out of the key holder 120. In other words, the first sensor may detect that the door 110 is opened, and the second sensor may detect that the electronic key 10 is taken out of the key holder 120. In this case, the control unit 180 may transmit a warning message to a user terminal of the taken out electronic key 10 or attempt a call connection. In addition, a warning notification may be output through at least one of the LCD panel L and the speaker S, which may be performed by a control operation of the control unit 180.

In another embodiment, the sensor may detect that the door 110 is opened for a certain period of time while the electronic key 10 is put in the key holder 120. In other words, the first sensor may detect that the door 110 is opened, and the second sensor may detect that the electronic key 10 is put in the key holder 120. In this case, the warning notification may be output through at least one of the LCD panel L and the speaker S, which may be performed by the control operation of the control unit 180.

The electronic key storage device 100 of the present invention may further include the camera C for photographing an object accessing the electronic key storage device 100.

In one embodiment, when the situation of opening the door 110 of the storage device 100 by means other than a predetermined authentication means through the camera C is photographed, a warning message may be transmitted to a manager terminal of the storage device 100 through the control unit 180 or a call connection may be attempted. Accordingly, the security for the electronic key storage device 100 may be reinforced.

The electronic key storage device 100 of the present invention may further include a light emitting unit 190 provided around the key holder 120.

The light emitting unit 190 may emit light in different colors according to the key holder 120 matching the electronic key 10 usable for each registered user.

That is, when the door 110 of the storage device 100 is opened after the user authentication is completed, the color of the light emitting unit 190 provided in the key holder 120 of the main body may be displayed to the user.

In this case, the light emission color may be set based on the key information of the electronic key 10 and the location information of the key holder 120 described above.

For example, the light emitting unit 190 of the key holder 120 in which the electronic key 10 that may be used by the registered user among the plurality of electronic keys 10 is accommodated may emit blue light as illustrated in FIG. 7A, and the light emitting unit 190 of the key holder 120 in which the electronic key 10 which may not be used is accommodated may emit red light as shown in FIG. 7C.

Accordingly, the usable electronic key 10 and the unusable electronic key 10 may be classified and guided to the registered user.

Meanwhile, when the electronic key 10 is put in the key holder 120, the electronic key 10 may be charged.

In this case, the light emitting unit 190 may emit light in different colors according to the state of charge of the electronic key 10.

In an embodiment, when the electronic key 10 is being charged, the electronic key 10 may emit yellow light, as illustrated in FIG. 7B, and when the electronic key 10 is completely charged, the electronic key 10 may emit green light.

In another embodiment, when the electronic key 10 that may be used by the user is being charged while the door 110 of the storage device 100 is open, the electronic key 10 may alternately emit blue light and yellow light, and when the electronic key 10 that may not be used by the user is being charged, the electronic key 10 may emit red light and yellow light.

The electronic key storage device 100 according to the present invention may further include an information acquisition unit that acquires access right information for each electronic key 10 on the electronic locking device 300.

In this case, the information acquisition unit may correspond to the input unit 130 or the data transmission/reception unit 150.

In one embodiment, the manager of the storage device 100 may select an arbitrary key from the electronic keys 10 stored in the key holder 120 through the input unit 130, and set the access right information on the electronic locking device for the selected electronic key 10.

In another embodiment, when the manager of the storage device 100 selects an arbitrary key from the electronic keys 10 stored in the key holder 120 through the manager terminal, and sets the access right information on the electronic locking device for the selected electronic key 10, the manager of the storage device 100 may receive the set information.

The access right information may include at least one of a type of the accessible electronic locking device 300 and a date, a day of the week, and a time when the access to the corresponding electronic locking device 300 is possible.

Meanwhile, the control unit 180 may download a key log of the electronic key 10 put in the key holder 120, and update the access right information stored in the electronic key 10 with the access right information obtained by the information acquisition unit. Here, the key log may mean information for locking and unlocking the electronic locking device 300.

The electronic key storage device 100 according to the present invention may further include an emergency key hole 20 provided in the door 110.

In the event of the emergency situations including the case where an error may occur in the user authentication unit 170, the authentication means may not be renewed due to the expiration of the validity period, or the like, the door 100 may arbitrarily be opened by inserting the separate emergency key (not illustrated) into the emergency key hole 20.

The electronic key storage device 100 according to the present invention may further include emergency power means such as an uninterruptible power supply (UPS) battery that may be provided inside the main body to cope with the case where the power supply is cut off.

Although the specific embodiments according to the present invention have been described so far, various modifications are possible without departing from the scope of the present invention. Therefore, the scope of the present invention should not be limited to the described embodiments and should not be defined by the claims to be described later, as well as the scope of the claims and their equivalents.

Although the present invention has been described with reference to the exemplary embodiments and the accompanying drawings, it is not limited to the above-mentioned exemplary embodiments but may be variously modified and changed from the above description by those skilled in the art to which the present invention pertains. Therefore, the idea of the present invention should be understood only by the claims described below, and all of the equivalences and equivalent modifications to the claims are intended to fall within the idea of the present invention.

The invention claimed is:

1. An electronic key storage device comprising:
   a door;
   at least one key holder;
   a storage unit configured to store preset key information of at least one electronic key usable for each registered user and location information of the at least one key holder matching the at least one electronic key, wherein each of the at least one key holder is respectively matched with each of the at least one electronic key corresponding to the location information of the each of the at least one key holder stored in the storage unit;
   a user authentication unit configured to perform user authentication by receiving user authentication information, the user authentication unit authorizing the door to open or close; and
   a control unit configured to control a fastening operation of the at least one key holder to put the at least one electronic key in the at least one key holder and take the at least one electronic key out of the at least one key holder.

2. The electronic key storage device of claim 1, wherein the user authentication unit performs user authentication by acquiring authentication information of any one of a password, biometric information, an NFC tag, and an RFID tag.

3. The electronic key storage device of claim 1, further comprising:
   a sensor configured to detect whether the door is opened or closed and whether the at least one electronic key is stored;
   a keypad;
   an LCD panel used as an input unit when a user inputs information through a touch operation, and used as an output unit when the input information is displayed on the LCD panel; and
   a speaker used as the input unit when the user inputs information through voice, and used as the output unit when the input information is output as voice,
   wherein a first sensor detects whether the door is opened while a second sensor detects whether the at least one electronic key is taken out of the at least one key holder or the at least one electronic key is put in the at least one key holder.

4. The electronic key storage device of claim 3, wherein when the sensor detects that the door is opened for a certain period of time while the at least one electronic key is put in the at least one key holder, a warning notification is output through at least one of the LCD panel and the speaker,
   wherein a warning message of the at least one electronic key which is taken out is transmitted to a user terminal or a call connection is attempted by the control unit and a warning notification is output through at least one of the LCD panel and the speaker, and
   wherein the LCD panel and the speaker are performed by a control operation of the control unit.

5. The electronic key storage device of claim 1, further comprising: a light emitting unit that is provided around the at least one key holder and emitting light in different colors according to the at least one key holder matching the at least one electronic key usable for each registered user.

6. The electronic key storage device of claim 5, wherein when the at least one electronic key is put in the at least one key holder, the at least one electronic key is charged, and the light emitting unit emits light in different colors according to the state of charge of the at least one electronic key.

7. The electronic key storage device of claim 1, further comprising:
   a camera configured to photograph an object accessing the electronic key storage device.

8. The electronic key storage device of claim 1, wherein the control unit updates firmware information of the at least one electronic key put in the at least one key holder.

9. The electronic key storage device of claim 1, further comprising:
   an information acquisition unit configured to acquire access right information for the each of the at least one electronic key on an electronic locking device.

10. The electronic key storage device of claim 9, wherein the access right information includes at least one of a date, a day of the week, and a time when the access to the electronic locking device is possible.

11. The control unit of claim 1, wherein the control unit updates a use history of the at least one electronic key received from the at least one electronic key.

12. The control unit of claim 1, wherein the control unit downloads a key log of the at least one electronic key put in the at least one key holder, and the key log includes information for locking and unlocking an electronic locking device.

13. The electronic key storage device in claim 1, further comprising:
   an emergency key; and
   an emergency key hole,
   wherein in case an error occurs in the user authentication unit, the door opens by inserting the emergency key into the emergency key hole.

14. The electronic key storage device of claim 1, further comprising an uninterruptible power supply (UPS) battery.

* * * * *